United States Patent [19]

Weber et al.

[11] Patent Number: 5,171,792

[45] Date of Patent: Dec. 15, 1992

[54] CROSSLINKABLE SATURATED AND UNSATURATED CARBOSILANE POLYMERS AND FORMULATIONS

[75] Inventors: William P. Weber; Xiugao Liao, both of Los Angeles, Calif.

[73] Assignee: University of Southern California, Los Angles, Calif.

[21] Appl. No.: 871,903

[22] Filed: Apr. 21, 1992

Related U.S. Application Data

[62] Division of Ser. No. 757,281, Sep. 10, 1991, Pat. No. 5,130,390.

[51] Int. Cl.$^5$ ............................................. C08F 30/08
[52] U.S. Cl. ................................. 525/326.5; 525/342; 525/370
[58] Field of Search ................... 525/326.5, 342, 370

[56] References Cited

PUBLICATIONS

Y. T. Park et al. (1990) Macromol 23, 1911–1915.
S. Q. Zhou et al. (1990) Macromol 23, 1915–1917.
W. P. Weber et al. (1990) Polym. Preprints 31(1), 44–45.
Yajima, S., et al., J. Mater. Sci., 1978, 13,2569.
Hirao, A. et al., *Macromolecules*, 1987, 20, No. 7, 1505.
Lammens, H., et al., Pol. Let., 1971, 9, 341.
Finkel'shtein, E. Sh., et al., Izvestiva Akademii *Nauk SSR, Seriya Khimicheskaya*, 1981 3, 641.
Horvath, R. H.; Chan, T. H., *J. Org. Chem.*, 1981, 52, No. 20, 4499.

Primary Examiner—Joseph L. Schofer
Assistant Examiner—M. Naguma
Attorney, Agent, or Firm—Connolly & Hutz

[57] ABSTRACT

Crosslinkable saturated and unsaturated carbosilane polymers are prepared by polymerizing vinyl substituted 1-silacyclo-pent-3-ene or vinyl substituted 1-silacyclobutane monomers in the presence of an anionic ring opening catalyst.

4 Claims, No Drawings

CROSSLINKABLE SATURATED AND UNSATURATED CARBOSILANE POLYMERS AND FORMULATIONS

This invention was made with Government support under Contract No. AFOSR-89-0007 by the Air Force Office of Scientific Research and Contract No. N00014-89-J-1961 by the Department of the Navy. The Government has certain rights in this invention.

This is a divisional application of Ser. No. 757,281, filed Sep. 10, 1991, now U.S. Pat. No. 5,130,390.

This invention relates to crosslinkable saturated and unsaturated carbosilane polymers and formulations, as well as methods of making the same.

BACKGROUND OF THE INVENTION

W. P. Weber and S. Q. Zhou in previous applications have claimed poly(unsaturated carbosilane) polymers and copolymers containing silyl hydride reactive groups in the polymer chain (Ser. No. 636,639 filed Dec. 29, 1990 now allowed and its continuation-in-part, Ser. No. 758,638). Also disclosed in those applications were prior art on the preparation of poly(1,1 dimethyl-1-silapent-3-ene) and poly(1,1-diphenyl-1-silapent-3-ene) by ring opening metathesis polymerization or anionic polymerization. The Weber and Zhou applications claim novel unsaturated carbosilane polymers and copolymers formed by anionic or metathesis polymerization which proceeds surprisingly in the presence of silylhydride in the monomer. Those skilled in the art would expect the initiating anion to displace hydride from silicon and would thus prevent anionic polymerization. The ring opening metathesis polymerization was surprising because the silylhydride does not reduce the tungsten catalyst and the polymerization proceeds to high molecular weight.

In *Isvestya Akademia Nauk* no. 8, 1448–1453, (1965), Nametkin et al disclose the preparation of insoluble crosslinked saturated silahydrocarbon polymers with pendant vinyl groups.

SUMMARY OF THE INVENTION

The present invention relates to novel vinyl bearing carbosilane polymers and copolymers with saturated or unsaturated polymer chains made by anionic polymerization. It further relates to crosslinking formulations of these polymers with silylhydride crosslinking agents and catalysts for carrying out hydrosilation crosslinking reactions. The polymers of this invention are vinyl bearing silapentene and silabutane polymers and their crosslinking formulations with aliphatic or aromatic silylhydride compounds containing more than one ≡SiH group.

Also, a novel method for preparing the vinyl bearing carbosilane polymers of the present invention has been discovered. Surprisingly, the polymers can be prepared by anionic ring opening polymerization of vinyl bearing silacyclopentenes or silacyclobutanes. This is surprising since all the prior art teaches that the vinyl group should either polymerize anionically or form a relatively stable anion adjacent to the silicon atom in the monomer. (Buell G-R, et. al. (1970) J Am Chem Soc 92:7424):(Rickle G-K (1986) J Macromol Sci Chem A23:1287.) Either of these reaction products would prevent the preparation of the polymers of this invention by anionic polymerization.

DESCRIPTION OF THE INVENTION

The substituted 1-silacyclo-pent-3-ene monomers of this invention are represented by the following general structural formula:

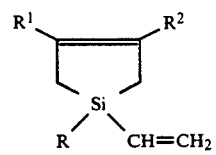

where R is vinyl, an alkyl radical containing from one to four carbon atoms or phenyl, $R^1$ is hydrogen, an alkyl radical containing from one to four carbon atoms, phenyl, or a halogen and $R^2$ is hydrogen, or $R^1$ and $R^2$ together with the two adjacent carbon atoms for each form a phenyl ring.

Representative silacyclopentene monomers include: 1-vinyl-1-methyl-1-silacyclopent-3-ene, 1-vinyl-1-phenyl-1-silacyclopent-3-ene, 1,1-divinyl-1-silacyclopent-3-ene, 2-methyl-2-vinyl-2-silaindan, 2-phenyl-2-vinyl-2-silaindan, and 2,2-divinyl-2-silaindan. Preferred monomers are 1-vinyl-1-methyl-1-silacyclopent-3-ene and 1-vinyl-1-phenyl-1-silacyclopent-3-ene.

The substituted 1-silacyclobutane monomers of this invention are represented by the following structural formula:

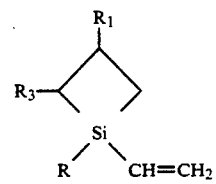

where R is vinyl, an alkyl groups with from one to four carbon atoms or phenyl, $R_1$ is hydrogen, an alkyl group with from one to four carbon atoms, phenyl, or a halogen, and $R_3$ is hydrogen, an alkyl grup with from one to four carbon atoms or phenyl.

The ring opening polymerizations proceed readily at low temperatures e.g. from about −20° C. to about −78° C. and at ambient pressures to produce polymers having repeating units of the structural formula:

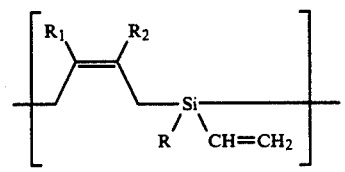

where R, $R_1$, and $R_2$ are as defined above and

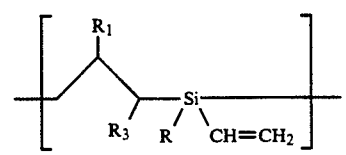

where R, $R_1$ and $R_3$ are as defined above.

The ring opening polymerization in accordance with this invention is carried out in the presence of known anionic ring-opening catalyst systems. Such catalyst systems include an organometallic base and cation coordinating ligand, such as an alkyllithium and hexamethylphosphoramide (HMPA) or N,N,N$^1$,N$^1$-tetramethylethylenediamine (TMEDA) catalyst systems.

The alkyllithium catalysts are used in conjunction with cation coordinating ligands, such as hexamethylphosphoramide (HMPA), N,N,N$^1$,N$^1$-tetramethylethylenediamine (TMEDA), N,N$^1$-dimethylpropyleneurea, in a polar solvent such as tetrahydrofuran (THF).

The silacyclopentene, silaindan, or silacyclobutane monomers may be copolymerized with each other or other silahydrocarbon rings to make a wide variety of block or random copolymers, terpolymers, and so forth. Preferred co-monomers have dimethyl, diphenyl, or phenyl methyl substituted silicon in the silahydrocarbon ring. A representative of this variety of copolymers can be prepared by copolymerization of monomers such as 1-phenyl-1-methyl-1-silacyclopent-3-ene and 1-vinyl-1-phenyl-1-silacyclopent-3-ene as described in the examples presented below.

Representative comonomers include 1,1-dimethyl-1-silacyclopent-3-ene, 1,1-diphenyl-1-silacyclopent-3-ene, 1,1-diethyl-1-silacyclopent-3-ene, 1,1,3-trimethyl-1-silacyclopent-3-ene, 3-chloro-1,1-dimethyl-1-silacyclopent-3-ene, 1-methyl-1-phenyl-1-silacyclopent-3-ene, 2,2-dimethyl-2-silaindan, 2,2-diphenyl-2-silaindan, 2,2-diethyl-2-silaindan, 2-methyl-2-phenyl-2-silaindan, 1,1-dimethyl-1-silacyclobutane, 1-ethyl-1-phenyl-1-silacyclobutane, 1,1-diphenyl-1-silacyclobutane. Preferred comonomers include 1,1-dimethyl-1-silacyclopent-3-ene, 1,1,3-trimethyl-1-silacyclopent-3-ene, 3-chloro-1,1-dimethyl-1-silacyclopent-3-ene, and 2,2-dimethyl-2-silaindan and 1,1-diethyl-1-silacyclobutane.

By varying the composition and relative amounts of the comonomers, it is possible to select copolymer and crosslinker combinations which produce a wide range of properties in the crosslinked polymer formulation.

The silylhydride crosslinking agents may be represented by the following general structural formula:

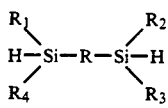

$$H-\underset{R_4}{\overset{R_1}{Si}}-R-\underset{R_3}{\overset{R_2}{Si}}-H$$

where R is an aromatic or aliphatic radical, and R$_1$, R$_2$, R$_3$, R$_4$ are hydrogen, phenyl, or an alkyl radical with from one to four carbon atoms. Typical crosslinking agents are 1,4-bis(dimethylsilyl)benzene, 1,1,4,4-tetramethylsilylethane, and 1,10-dimethyl-1,10-disiladecane.

The hydrosilation crosslinking reaction is catalyzed by many Group VIII metal compounds but predominate among these are platinum compounds. Suitable platinum complexes are formed from Speiers catalyst which is chloroplatinic acid dissolved in isopropyl alcohol and usually added at 10$^{-4\text{-}to\text{-}6}$ mole/mole reactant. Other useful soluble platinum-vinyl siloxane complexes are sold by Huls America under the product designation PC072 and PC075.

Various particulate, fibrous, or fabric fillers and reinforcements can be processed with the polymer formulations of this invention to give laminates or molded articles. Solutions of these polymer formulations may be used to facilitate coating substrates like fiberglass nonwoven mats or cloth. Such coatings on glass or metal substrates promote adhesion, provide environmental protection, or impart the property of selective permeability. Because of their low dielectric constant the polymer formulations of this invention are useful matrix materials for printed circuit boards.

The polymers can be modified or crosslinked to change their physical and chemical properties. The polymers can be modified by reacting the carbon-carbon double bonds. Representative reactions of the carbon-carbon double bonds are ionic and free radical addition reactions, such as addition of hydrobromic acid, catalytic hydrogenation, hydroboration, and the like. The permeability of polymer coatings, for example, can be varied by adding halocarbon or silane groups through addition reactions with the carbon-carbon double bond. The adhesiveness of such coatings can be increased by reacting polar groups, such as alkoxysilanes, to the carbon-carbon double bonds.

The presence of olefinic unsaturation provides convenient sites for subsequent vulcanization or cross-linking by ionic, free radical or thermal means known to the art.

The examples below are included to illustrate the invention. They are not limitations thereon.

NMR Spectroscopy: $^1$H, $^{13}$C and $^{29}$Si NMR spectra were obtained either on an IBM Brucker 270-SY or a Brucker AM-360 spectrometer operating in the Fourier transform mode. $^{13}$C NMR spectra were run with broad band proton decoupling. A heteronuclear gated decoupling pulse sequence with a pulse delay of 20 s(NONOE) was used to obtain $^{29}$Si NMR spectra. Ten to fifteen percent solutions in CDCl$_3$ were used to obtain $^{13}$C and $^{29}$Si spectra. Five percent solutions were used to obtain $^1$H NMR spectra. $^{29}$Si NMR spectra were externally referenced to TMS.

UV Spectroscopy: UV spectra were recorded on a Shimadzu-260 UV visible spectrometer. Spectra quality THF was used to prepare solutions for UV spectroscopy.

Gel permeation chromatography (GPC): The molecular weight distribution of the polymer was performed on a Waters system. This was comprised of a UGK injector, a 510 pump, a R401 differential refractometer and a Maximum 820 data station. A 7.8 mm×30 cm waters Ultrastyragel linear gel column packed with less than 10 μm particle size mixed pore size crosslinked styrene divinylbenzene copolymer maintained at 25° C. was used for the analysis. The eluting solvent was HPLC grade THF at a flow rate of 0.6 mL/minute. The retention times were calibrated against at least five appropriate known monodisperse polystyrene standards whose M$_w$/M$_n$ were less than 1.09.

Elemental Analysis: Elemental Analysis was performed by Galbraith Laboratories, Knoxville, Tenn.

THF was distilled from a blue solution of sodium benzophenone ketyl immediately prior to use. Hexamethylphosphoramide (HMPA) was distilled from calcium hydride and stored over a 4 Å molecular sieves. Hexane was distilled from LiAlH$_4$.

n-Butyllithium in hexane (2.5 mol l$^{-1}$) (from Aldrich) were used as received. Dichloromethylsilane, dichlorophenylsilane, trichlorosilane and other silanes (from Petrarch Systems) were purified by fractional distillation.

All reactions were carried out under an Argon atmosphere. All glassware was flamedried immediately prior to use.

EXAMPLE 1

1-Methyl-1-Phenyl-1-Silacyclopent-3-ene

In a 500 mL two neck rb flask equipped with a reflux condenser, a Teflon covered magnetic stirring bar and a rubber septum was placed active magnesium powder (9.6 g, 0.4 mol), methylphenyldichlorosilane (38.2 g, 0.2 mol) and THF (300 mL). The reflux condenser was connected to a refrigeration unit. Ethylene glycol cooled to $-20°$ C. was circulated through the reflux condenser. 1,3-Butadiene (15.1 g, 0.28 mol) was condensed at $-78°$ C. into a volumetric flask which was sealed with a rubber septum. The 1,3-butadiene was transferred into the reaction via a cannula. The reaction mixture was stirred at rt for 24 h. Ether ($2 \times 100$ mL) was added. The organic solution was decanted from the magnesium chloride salts. These were transferred to a sintered glass funnel and were washed with ether (100 mL). The combined organic solution was washed with water ($2 \times 50$ mL), dried over anhydrous magnesium sulfate, filtered and the volatile solvents removed by evaporation under reduced pressure. The residue was purified by distillation through a 10 cm vacuum jacketed Vigreux column. The expected compound, bp $105°-107°$ C., 5 mm Hg, 42% yield, was collected.

EXAMPLE 2

1-Phenyl-1-Vinyl-1-Silacyclopent-3-ene

1-Phenyl-1-vinyl-1-silacyclopent-3-ene was prepared by the reaction of phenylvinyldichorosilane, 1,3-butadiene, and magnesium in THF as in example 1. Spectral properties $^1$H NMR $\delta$: 1.70(s,4H), 5.92(d,d,1H, J=20 Hz, 3.8 Hz), 6.01(s,2H), 6.17(d,d,1H,J=14.7 Hz, J=3.8 Hz), 6.46(d,d,1H,J=20 Hz, J=14.7 Hz), 7.40(m,3H), 7.62(m,2H). $^{13}$C NMR $\delta$: 16.09, 127.87, 129.38, 130.84, 134.26, 134.62, 134.75, 136.00. $^{29}$Si NMR $\delta$: 4.69.

EXAMPLE 3

1,1-Divinyl-1-Silacyclopent-3-ene

In a 1 L three neck flask equipped with a Teflon covered magnetic stirring bar, reflux condenser and a pressure equalizing addition funnel. Vinyl magnesium bromide (0.5 mol) in THF 350 mL was placed in the reaction flask. The flask and its contents were cooled to 0° C. in an ice water bath. 1,1-Dichloro-1-silacyclopent-3-ene (Damrauer, R.; Simon, R.; Laporterie, A.; Manuel, G.; Park, Y. T.; Weber, W. P. J. Organomet. Chem., 1990, 391, 7) (11 g, 72 mmol) dissolved in 20 mL of THF was placed in the addition funnel and was added dropwise to reaction flask. The reaction was allowed to slowly warm to room temperature over 6 hours. The reaction mixture was poured into ice cold solution of saturated aqueous ammonium chloride. Ether (200 mL) was added and the organic layer was washed with an equal volume of water (3X). The organic layer was dried over anhydrous calcium chloride, filtered and the volatile organic solvents were removed by distillation through a 15 cm vacuum jacketed Bigreux column at atmospheric pressure. The product was distilled under reduced pressure. A fraction bp $43°-45°$ C./16 mm Hg, 9.4 g, 95% yield was obtained. $^1$H NMR: 1.44(d,4H,J=1 Hz), 5.87(t,2H,J=1 Hz), 5.81(dd,2H,J=20 and 3.9 Hz), 6.06(dd,2H,J=14.5 and 3.9 Hz), 6.22(dd,2H,J=20 and 14.5 Hz). $^{13}$C NMR: 15.46, 130.71, 134.00, 135.02. $^{29}$Si NMR: 1.56. IR: 3040, 3020, 2940, 2885, 1605, 1400, 1200, 1095, 1000., 950, 9430, 815, 795, 725, 690 cm$^{-1}$. UV nm ( ): 207 ($2.5 \times 10^3$). Anal. Calc. for C$_8$H$_{12}$Si: C, 70.51; H, 8.88. Found: C, 70.96; H, 9.06.

EXAMPLE 4

Poly(1-Phenyl-1-vinyl-1-sila-cis-pent-3-ene) (I)

In a 100 mL rb flask equipped with a Teflon covered magnetic stirring bar and rubber septum was placed 1-phenyl-1-vinyl-1-silacyclopent-3-ene (1.00 g, 5.4 mmol), THF (40 mL) and HMPA (40 µL). The mixture was cooled to $-78°$ C. and a hexane solution of N-butyllithium (80 µL, 2.5M, 0.2 mmol) was added via a syringe. The reaction mixture was stirred at $-78°$ C. for 1 h. A saturated solution of aqueous ammonium chloride (15 mL) was added. The organic layer was separated, washed with water (20 mL), dried over anhydrous magnesium sulfate, filtered and the volatile solvents removed by evaporation under reduced pressure. The residue was dissolved in a minimum amount of THF and (I) was precipitated from methanol. This process was repeated twice. (I) was dried under vacuum. In this way, 0.80 g, 80% yield of (I), $M_w/M_n = 10,400/6,800$ was obtained. $^1$H NMR s: 0.89 (br,s,0.16H), 1.34 (br,s,0.16H), 1.51 (br,s,0.15H), 1.71 (d,4H,J=5.4 Hz), 5.35 (t,2H,J=5.4 Hz), 5.77 (d,d,1H,J=20 Hz,J=3 Hz), 6.11 (d,d,1H,J=14.5 Hz, J=3.7 Hz), 6.23 (d,d,1H,J=20 Hz,J=14.5 Hz), 7.34 (m,3H), 7.46 (m,2H). $^{13}$C NMR $\delta$: 13.77, 127.64, 129.17, 134.50, 134.59, 134.80, 135.71. $^{29}$Si NMR $\delta$: $-13.24$. IR $\nu$: 3069, 3051, 3020, 2968, 2945, 2916, 2890, 1609, 1592, 1429, 1404, 1235, 1204, 1172, 1115, 1100, 1007, 956, 945, 878, 817, 802, 726, 698, 638, 618 cm$^{-1}$. UV$\lambda_{max}$ nm($\zeta$) (ether) 216 (18,500). Anal. Calc. for C$_{12}$H$_{14}$Si: C, 77.39; H, 7.58. Found: C, 76.53; H, 7.83.

EXAMPLE 5

Copolymer of poly(1-Phenyl-1-vinyl-1-sila-cis-pent-3-ene) and poly(1-methyl-1-phenyl-1-sila-cis-pent-3-ene (III)

In a 100 mL rb flask equipped with a Teflon covered magnetic stirring bar and rubber septum were placed 1-phenyl-1-vinyl-1-silacyclopent-3-ene (0.50 g, 2.7 mmol) and 1-methyl-1-phenyl-1-silacyclopent-3-ene (0.50 g, 2.9 mmol), THF (40 mL) and HMPA (40 µL). The mixture was cooled to $-78°$ C. and a hexane solution of N-butyllithium (80 µL, 2.5M, 0.2 mmol) was added via a syringe. The reaction mixture was stirred at $-78°$ C. for 1 h. A saturated solution of aqueous ammonium chloride (15 mL) was added. The organic layer was separated, washed with water (20 mL), dried over anhydrous magnesium sulfate, filtered and the volatile solvents removed by evaporation under reduced pressure. The residue was dissolved in a minimum amount of THF and (III) was precipitated from methanol. This process was repeated twice. (III) was dried under vacuum. In this way, 0.78 g, 78% yield of (III), $M_w/M_n = 13,000/8,800$ was obtained. $^1$H NMR $\delta$: 0.25(s,1.7H), 1.63(m,2.2H), 1.72(m,1.8H), 5.33 (m,2H), 5.78 (d,d,0.45H, J=20 Hz, J=4 Hz), 6.11(d,d,0.45H, J=14.8 Hz, J=4 Hz), 6.24 (d,d,0.45H, J=20 Hz, J=14.8 Hz), 7.33(m,3H), 7.49(m,2H). $^{13}$C NMR $\delta$: $-5.49$, 13.63, 13.76, 15.22, 15.35, 122.79, 123.24, 123.69, 127.62, 128.95, 129.14, 133.82, 134.39, 134.58, 134.81, 135.72, 137.75. $^{29}$Si NMR $\delta$: $-13.32$, $-13.29$, $-13.25$, $-4.40$, $-4.35$, $-4.30$. IR $\nu$: 3069, 3049, 3009, 2955, 2924, 2886, 1638, 1428, 1404, 1376, 1250, 1152, 1113, 1027, 998, 954, 930, 787, 732, 699, 618 cm$^{-1}$. UV$\lambda_{max}$ nm($\zeta$) (ether) 216 (25,040).

EXAMPLE 6

Crosslinking of poly(1-phenyl-1-vinyl-1-sila-cis-pent-3-ene) with 1,1,10,10-tetramethyl-1,10-disiladecane 0.0575 g 1-phenyl-1-vinyl-1-silacyclopent-3-ene, 0.0354 g 1,1,10,10-tetramethyl-1,10-disiladecane, and 0.0023 g diluted PC075 platinum (0.3 wt. % Pt) complex (Huls America) were mixed and placed on a ceramic mounted sensor in a Dupont Dielectric Analyzer. The dielectric constant and dissipation factor of the sample before curing was 3.03 and 0.0877 (1 KH$_z$). The sample was heated to 110° C. for 4 hours and cooled under nitrogen to 30° C. to give a cured polymer dielectric constant (E 2.18) and dissipation factor (DF 0.0044).

EXAMPLE 7

Crosslinking of the Copolymer of Poly(1-phenyl-1-vinyl-1-sila-cis-pent-3-ene) and Poly(1-methyl-1-phenyl-1-sila-cis-pent-3-ene) with 1,1,10,10-tetramethyl-1,10-disiladecane 0.0869 g of the copolymer above, 0.0247 g 1,1,10,10-tetramethyl-1,10-disiladecane, and 0.0010 g diluted (0.3 wt. % Pt) PC075 platinum complex (Huls America) were mixed and placed on a ceramic mounted sensor in a Dupont Dielectric analyzer. The dielectric constant and dissipation factor of the sample before curing was 2.27 and 0.0785 at 1 KH$_z$. After curing at 110° C. for 4 hours and cooling to 30° C. under nitrogen the dielectric constant and dissipation factor of the cured resin was E 2.23 DF 0.0055. After curing up to 200° C. (2 hr at 200° C.) under N$_2$, the dielectric constant was 2.27 and the dissipation factor was 0.0085.

EXAMPLE 8

1-phenyl-1-vinyl-1-silacyclobutane

A dry 250 ml three neck round bottom flask equipped with a dropping funnel and condenser with nitrogen inlet system. Was placed 4.2 g (23 mmole) 1-chloro-1-phenyl-1-silacyclobutane in 40 ml THF. With stirring, 25 ml (0.1M) vinyl magnesium bromide (in THF) was added dropwise. The mixture was stirred for additional 6 h. Work up, the mixture was distilled to collect 2.8 g 82°-83° C./3.0 mmHg 70% yield was obtained.

EXAMPLE 9

Poly(1-phenyl-1-vinyl-1-silabutane)

In a 100 mL rb flask equipped with a Teflon covered magnetic stirring bar and rubber septum was placed 1-phenyl-1-vinyl-1-silacyclobutane (1.00 g, 5.4 mmol), THF (40 mL) and HMPA (40 µL). The mixture was cooled to −78° C. and a hexane solution of n-butyllithium (80 µL, 2.5 M, 0.2 mmol) was added via a syringe. The reaction mixture was stirred at −78° C. for 1 h. A saturated solution of aqueous ammonium chloride (15 mL) was added. The organic layer was separated, washed with water (20 mL), dried over anhydrous magnesium sulfate, filtered and the volatile solvents removed by evaporation under reduced pressure. The residue was dissolved in a minimum amount of THF and poly(1-phenyl-1-vinyl-1-silabutane) was precipitated from methanol. This process was repeated twice. The polymer was dried under vacuum. In this way, 0.63 g, 63% of polymer was obtained, M$_w$/M$_n$=15,800/11,300 was obtained. Tg=−18. $^1$H NMR ($\delta$) 0.845 (m. 4H), 1.370 (m. 2H), 5.850 (m. 1H), 6.012 (m. 1H), 6.147 (m. 1H), 7.296 (m. 3H), 7.378 (m. 2H). $^{13}$C NMR ($\delta$) 127.64, 128.82, 133.76, 134.37, 135.76, 136.60. $^{29}$Si NMR ($\delta$) −10.86. IR ($\nu$) 3135, 3068, 3048, 3009, 2919, 2875, 2793, 1653, 1591, 1487, 1456, 1427, 1403, 1336, 1302, 1261, 1235, 1216, 1191, 1140, 1110, 952, 900, 790, 699. UV $\lambda$max nm($\zeta$) 271 (913), 266 (1680), 260 (1933), 254 (1267), 230 (9667). C$_{11}$H$_{14}$Si Calc. C; 75.68, H; 8.28. Found. C; 75.83, H; 8.10.

EXAMPLE 10

Crosslinking of Poly(1-phenyl-1-vinyl-1-silabutane) and 1,1,10,10-tetramethyl-1,10-disiladecane 0.0890 g poly(1-phenyl-1-vinyl-1-silabutane), 0.0588 g. 1,1,10,10-tetramethyl-1,10-disiladecane and 0.0022 g diluted (0.3% Pt) PC075 platinum catalyst (Huls America Inc.) were mixed and placed on a ceramic mounted sensor in a Dupont Dielectric Analyzer. The sample was heated at 110° C. for four hours and then cooled to 30° C. under nitrogen. The dielectric constant of the cured sample was 2.29 (1 KH$_z$) and the dissipation factor was 0.0029.

We claim:

1. A crosslinking composition containing a poly(unsaturated carbosilane) comprising a plurality of repeating units of the formula

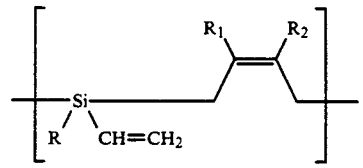

wherein R is vinyl, alkyl containing one to four carbon atoms or phenyl;
R$_1$ is hydrogen, alkyl containing one to four carbon atoms, phenyl, or halogen; and
R$_2$ is hydrogen or R$_1$ and R$_2$ together with the adjacent carbon atoms of each form a phenyl ring;
a hydrosilation catalyst; and
a silyl hydride crosslinking agent of the formula

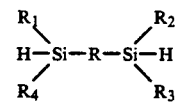

wherein R is aliphatic or aromatic and R$_1$, R$_2$, R$_3$ and R$_4$ are each alkyl containing from one to four carbon atoms or phenyl.

2. A crosslinking composition containing a polycarbosilane comprising a plurality of repeating units of the formula

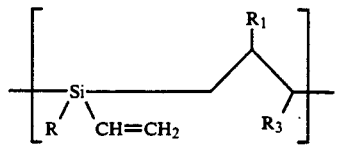

wherein R is vinyl, alkyl containing one to four carbon atoms or phenyl; $R_1$ is hydrogen, alkyl containing one to four carbon atoms, phenyl or halogen; and $R_3$ is hydrogen, alkyl containing one to four carbon atoms or phenyl.

a hydrosilation catalyst; and a silyl hydride crosslinking agent of the formula

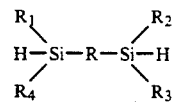

wherein R is aliphatic or aromatic and $R_1$, $R_2$, $R_3$ and $R_4$ are each alkyl containing from one to four carbon atoms or phenyl.

3. A crosslinked polymer obtained by ionic or free radical crosslinking of the composition claimed in claim 1.

4. A crosslinked polymer obtained by thermal crosslinking of the composition claimed in claim 1.

* * * * *